US012611925B2

(12) United States Patent
Loch et al.

(10) Patent No.: US 12,611,925 B2
(45) Date of Patent: Apr. 28, 2026

(54) PRESSURE CONTAINER SYSTEM HAVING A LOAD-DISTRIBUTING BASE LAYER

(71) Applicant: Bayerische Motoren Werke Aktiengesellschaft, Munich (DE)

(72) Inventors: Robert Loch, Munich (DE); Hans-Ulrich Stahl, Munich (DE); Christoph Warkotsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 406 days.

(21) Appl. No.: 18/267,527

(22) PCT Filed: Dec. 15, 2021

(86) PCT No.: PCT/EP2021/085990
§ 371 (c)(1),
(2) Date: Jun. 15, 2023

(87) PCT Pub. No.: WO2022/129227
PCT Pub. Date: Jun. 23, 2022

(65) Prior Publication Data
US 2024/0051383 A1 Feb. 15, 2024

(30) Foreign Application Priority Data
Dec. 16, 2020 (DE) ..................... 10 2020 133 724.8

(51) Int. Cl.
*B60K 15/07* (2006.01)
*F17C 13/08* (2006.01)
(Continued)

(52) U.S. Cl.
CPC ............ *B60K 15/07* (2013.01); *F17C 13/084* (2013.01); *B60K 2015/03151* (2013.01); *B60K 2015/0634* (2013.01); *F17C 2205/0196* (2013.01)

(58) Field of Classification Search
CPC ...................................................... B60K 15/07
See application file for complete search history.

(56) References Cited

U.S. PATENT DOCUMENTS 7,270,209 B2 * 9/2007 Suess ............... B60K 15/03006
224/538
2006/0033322 A1 2/2006 Suess
(Continued)

FOREIGN PATENT DOCUMENTS

DE 10 2005 037 636 A1 2/2006
DE 10 2017 004 902 A1 11/2018
(Continued)

OTHER PUBLICATIONS

International Search Report (PCT/ISA/210) issued in PCT Application No. PCT/EP2021/085990 dated Apr. 7, 2022 with English translation (4 pages).
(Continued)

*Primary Examiner* — Kevin Hurley
(74) *Attorney, Agent, or Firm* — Crowell & Moring LLP

(57) ABSTRACT

The technology disclosed here relates to a pressure container system. The pressure container system includes a plurality of pressure containers for storing fuel and at least one load-distributing base layer. The load-distributing base layer is advantageously arranged between a lower base plate and the plurality of pressure containers. The load-distributing base layer is designed such that forces F, which act locally on the lower base plate and which act on the lower base plate substantially in the direction of the vehicle vertical axis Z, can be distributed to the plurality of pressure containers.

19 Claims, 7 Drawing Sheets

(51) Int. Cl.
  *B60K 15/03* (2006.01)
  *B60K 15/063* (2006.01)

(56)  References Cited

U.S. PATENT DOCUMENTS

| | | |
|---|---|---|
| 2006/0061081 A1 | 3/2006 | Kresse, Jr. et al. |
| 2019/0047411 A1 | 2/2019 | Kataoka et al. |
| 2019/0047633 A1 | 2/2019 | Sawai |

FOREIGN PATENT DOCUMENTS

| | | | |
|---|---|---|---|
| DE | 10 2017 214 301 A1 | 2/2019 | |
| DE | 10 2018 119 087 A1 | 2/2019 | |
| DE | 102020113473 A1 * | 11/2021 | ............... F17C 1/00 |
| DE | 202023104120 U1 * | 8/2023 | ............ B60K 15/07 |
| JP | 2019-33657 A | 2/2019 | |

OTHER PUBLICATIONS

German-language Written Opinion (PCT/ISA/237) issued in PCT Application No. PCT/EP2021/085990 dated Apr. 7, 2022 (5 pages).
German-language Search Report issued in German Application No. 10 2020 133 724.8 dated Oct. 29, 2021 with partial English translation (13 pages).

\* cited by examiner

PRESSURE CONTAINER SYSTEM HAVING A LOAD-DISTRIBUTING BASE LAYER

BACKGROUND AND SUMMARY OF THE INVENTION

Motor vehicles having pressure vessels are known from the prior art. Generally, up to three large pressure vessels are provided per motor vehicle. Such pressure vessels are relatively difficult to integrate in a motor vehicle owing to their dimensions. There are also vehicle concepts in the case of which considerably more pressure vessels are integrated in the motor vehicle, each individual pressure vessel having a substantially tubular shape. FIG. 1 shows such a system. The multiple pressure vessels 10 are disposed between the supports 50 of the bodywork. An underbody panel 70 is provided on the underside of the motor vehicle (not shown).

Possible mechanical loading can be applied to the pressure vessel system if the motor vehicle hits a traffic bollard. The underbody panel 70 hitting a bollard brings about a force F which acts locally and substantially in the direction of the vehicle vertical axis Z. The impact energy from the bollard that is generated by the impact leads to the underbody panel 70 deforming and being subjected to load (cf. underbody panel 70' shown in dashed line) in the manner of a drumskin being struck or a trampoline being jumped on. The impact energy is converted by the application of load to the underbody panel 70 and its plastic and elastic deformation. The underbody panel 70 is relatively far away from the pressure vessels 10 in order that the impact energy is not transferred to the pressure vessels 10.

This solution is disadvantageous, inter alia, in that a relatively large amount of installation space is required in the underfloor region for taking up the impact energy and cannot be utilized to store fuel. Therefore, the achievable range of the motor vehicle decreases while maintaining the same installation space.

A preferred object of the technology disclosed here is to mitigate or overcome at least one disadvantage of a previously known solution or to propose an alternative solution. It is in particular a preferred object of the technology disclosed here to propose a pressure vessel system which is relatively simple, cost-effective, reliable, lightweight and/or optimized in terms of installation space. Further preferred objects can result from the advantageous effects of the technology disclosed here. The object(s) is/are achieved by the subject matter of patent claim 1. The dependent claims constitute preferred embodiments.

The technology disclosed here relates to a pressure vessel system for a motor vehicle (for example passenger cars, motorcycles, utility vehicles). The pressure vessel system comprises multiple pressure vessels for storing fuel. The pressure vessel system also comprises at least one load-distributing base layer. The load-distributing base layer is advantageously disposed between a lower baseplate and the multiple pressure vessels. The load-distributing base layer may be designed to distribute forces that act locally on the lower baseplate, and act on the lower baseplate substantially in the direction of the vehicle vertical axis, over the multiple pressure vessels.

In this context, the vehicle vertical axis is the direction which extends perpendicularly in relation to the underlying surface in the position of use of the motor vehicle. The vehicle longitudinal axis runs in the direction of travel and the vehicle transverse axis runs in the transverse direction. All three vehicle axes are perpendicular to one another.

The pressure vessel system serves to store fuel which is gaseous under ambient conditions. The pressure vessel system may, for example, be used in a motor vehicle which runs on compressed natural gas (CNG) or liquid natural gas (LNG) or hydrogen. The pressure vessel system is fluidically connected to at least one energy converter, which is designed to convert the chemical energy of the fuel into other forms of energy, for example a fuel cell or a combustion engine.

The pressure vessels may for example be a high-pressure gas vessel. High-pressure gas vessels are designed to store fuel over long periods of time at a nominal working pressure (NWP) of at least 350 bar(g) (=gage pressure above atmospheric pressure) or at least 700 bar(g) at ambient temperatures. The pressure vessels may have circular or oval cross sections. For example, multiple pressure vessels with longitudinal axes running parallel to one another in the installation position may be provided. The individual pressure vessels may each have a length to diameter ratio with a value between 4 and 200, preferably between 5 and 100, and particularly preferably between 6 and 50. The length to diameter ratio is the quotient of the total length of the individual pressure vessels (for example total length of a storage pipe without fluidic connection elements) as the numerator and the largest outside diameter of the pressure vessel as the denominator. The individual pressure vessels may be directly adjacent to one another, for example at a distance from one another of less than 20 cm or less than 15 cm or less than 10 cm or less than 5 cm. The multiple pressure vessels may each be coupled to one another mechanically at one end or at both ends. Advantageously, it may also be provided that respective bodywork attachment elements, which are shared by the multiple pressure vessels and by means of which the pressure vessels can be fastened in the motor vehicle, are provided at both ends. Such a system is particularly suitable for flat installation spaces, in particular in the underfloor region below the vehicle interior space. In a preferred embodiment, the multiple pressure vessels, together with the at least one load-distributing base layer disclosed here and/or the one or more bodywork attachment elements, form a pressure vessel assembly. Expediently, the pressure vessel assembly may be received in a housing. Such a pressure vessel assembly (possibly with a housing) are usually integrated in the motor vehicle as a structural element. The entire pressure vessel assembly can also be mountable in a motor vehicle in one mounting step.

The lower baseplate is also referred to as base panel and generally, at least in certain regions, forms the outer shell of the motor vehicle towards the underlying surface. It protects the motor vehicle from environmental influences such as spray water, etc. The baseplate is usually not a plate with a planar form but rather a panel matched to the underbody subassembly or underbody geometry. Generally, the lower baseplate has a wall thickness of approximately 1 mm to approximately 8 mm, preferably approximately 1.5 mm to approximately 4 mm. Advantageously, the base panel is produced from steel or a steel alloy.

The lower baseplate and the load-distributing base layer may be formed in one piece, or integrally. To this end, for example, components of the structural element thus formed can be produced from the same material and/or integrally bonded. In one embodiment, the pressure vessels may be fastened directly to the load-distributing base layer and make contact with it in the installation position. For example, the pressure vessels may be adhesively bonded to the base layer.

In a further embodiment, receiving recesses are provided in the load-distributing base layer, wherein a respective pressure vessel is at least partially received in each receiving recess. The receiving recesses reduce the installation space requirement while maintaining the same stiffness of the base layer and serve at least partially as guide element in the event of deformation caused by an impact.

Advantageously, the pressure vessel system may be designed to transfer the impact energy (depending on the magnitude of the impact energy) acting on the lower baseplate from the outside—that is to say from the underlying road surface—at least partially via the multiple pressure vessels to the upper underfloor covering. Preferably, at least some of the impact energy from the lower baseplate and/or from the load-distributing base layer is converted and the rest is transferred substantially to the upper underfloor covering. It is thus advantageously provided that the impact energy is not completely dissipated in the floor gap. Instead, according to the technology disclosed here, it is provided that that fraction of the impact energy that acts on the multiple pressure vessels is transferred from the multiple pressure vessels to the upper underfloor covering. Advantageously, it may be provided that the pressure vessel system, in particular the load-distributing base layer and the multiple pressure vessels, is designed to allow a displacement of the multiple pressure vessels into the mounting clearance in the direction of the vehicle vertical axis for at least partial conversion and/or at least partial conveyance of the impact energy.

One pressure vessel of the multiple pressure vessels, which is provided directly in the region of the locally acting forces, can be referred to as local, or proximal, pressure vessel. If the load-distributing layer were not provided, the locally acting forces would merely be transferred via the lower baseplate to the proximal pressure vessel, in the event the impact energy was not already converted in the floor gap (cf. FIG. 1). Further pressure vessels, also referred to as directly adjacent, or distal, pressure vessels, are directly adjacent to this proximal pressure vessel generally on both sides. Expediently, the load-distributing base layer can distribute the external forces acting locally on the lower baseplate over the multiple pressure vessels in such a way that the locally acting forces are divided between both the proximal pressure vessel and the distal pressure vessels. This is the load-distributing action of the load-distributing base layer. Preferably, the load-distributing base layer is designed in such a way that at least 20% or at least 45% or at least 70% of the forces resulting from the impact, or that at least 20% or at least 45% or at least 70% of the impact energy resulting from the impact, is transferred to directly adjacent pressure vessels of the multiple pressure vessels.

The upper underfloor covering may be formed for example by a top side of a housing of the pressure vessel system. As an alternative or in addition, the upper underfloor covering may be a portion of the motor vehicle bodywork, for example a wall, which delimits the vehicle interior space from the underfloor region. This wall may for example be formed of panels and structure-reinforcing elements. The underfloor covering may be completely or partially closed. For example, multiple support portions may also form the underfloor covering.

The pressure vessel system may also comprise a load-distributing cover layer for the more uniform distribution of the impact energy acting on the lower baseplate from the outside. The load-distributing cover layer is generally provided in the mounting clearance. The load-distributing cover layer may in particular be designed to transfer that fraction of the impact energy that is transferred from at least one pressure vessel to the cover layer over the upper underfloor covering more uniformly. Preferably, the load-distributing cover layer and the upper underfloor covering are formed in one piece, or integrally. To this end, the cover layer and the underfloor covering may be produced from the same material and/or integrally bonded.

In the installation position in the motor vehicle, expediently a mounting clearance (above the pressure vessels), which spaces the pressure vessels apart from an upper underfloor covering in the direction of the vehicle vertical axis, is provided at least in certain regions between the pressure vessels and the upper underfloor covering. A floor gap may be formed between the multiple pressure vessels and the lower baseplate. The load-distributing base layer is provided in this floor gap. The load-distributing base layer and the load-distributing cover layer may at least partially and preferably completely fill the floor gap and the mounting clearance, respectively. The layer thickness of the load-distributing base layer and of the load-distributing cover layer may be at least 50% or at least 80% of the gap width of the minimum floor gap and of the minimum mounting clearance, respectively, at least in certain regions.

The load-distributing base layer, the load-distributing cover layer and/or the lower baseplate span or cover the multiple pressure vessels. Preferably, the load-distributing base layer, the load-distributing cover layer and/or the lower baseplate span or cover at least 60% or at least 80% of the lateral surface of the multiple pressure vessels.

The load-distributing base layer, the load-distributing cover layer and/or the lower baseplate may each have two sides, each of which has a surface area of approximately 0.3 $m^2$ to approximately 4 $m^2$ or approximately 1 $m^2$ to approximately 3 $m^2$.

The layer thickness, in particular the average layer thickness or the minimum layer thickness, of the load-distributing base layer and/or of the load-distributing cover layer may be at least 3 mm or at least 8 mm or at least 10 mm or at least 15 mm or at least 20 mm. The layer thickness of the load-distributing base layer is advantageously thicker than the layer thickness of the lower baseplate at least by a factor of 115 or at least by a factor of 2 or at least by a factor of 2.5. In one embodiment, the load-distributing base layer is as thick as the lower baseplate. The load-distributing base layer may have a stiffness against deformation in the direction of the vehicle vertical axis Z which is higher than the corresponding stiffness of the lower baseplate at least by a factor of 10 or at least by a factor of 20.

The load-distributing base layer and/or the load-distributing cover layer may comprise a foamed material, particularly preferably a metal foam. Such a material has an advantageous stiffness for the load distribution together with low inherent weight. Metal foam moreover has advantageous heat conduction properties. This can be advantageous in particular in order, in the case of local thermal events, to transport the locally occurring heat energy to a thermal pressure relief device. To this end, it may be provided that at least one thermal pressure relief device is connected in terms of heat conduction to the load-distributing base layer and/or the load-distributing cover layer for the purpose of thermal pressure relief. The load-distributing base layer and/or the load-distributing cover layer may comprise an auxetic material. Such a material is particularly well suited for the load distribution disclosed here over a larger surface area. In a preferred embodiment, the load-distributing base layer and/or the load-distributing cover layer may comprise intumescent material. Expediently, the intumescent material may be a material layer which is advantageously provided on that inner side of the load-distributing base layer and/or of the load-distributing cover layer that faces toward the pressure vessels. Advantageously, the actions of thermal events can thus be mitigated. The load-distributing base layer and/or the load-distributing cover layer may comprise a sandwich structure, a lattice structure and/or a honeycomb structure. Such a construction enables relatively good stiffness together with relatively low inherent weight.

The forces acting on the lower baseplate locally and substantially in the direction of the vehicle vertical axis may in particular be forces that result from an impact or collision with a traffic bollard. Forces acting substantially in the direction of the vehicle vertical axis are forces that act in the direction of the vehicle vertical axis or act only with a slight deviation from the vehicle vertical axis. In addition to the forces occurring along the vehicle vertical axis, forces in other directions (e.g. vehicle transverse axis or vehicle longitudinal axis) and moments in all directions can also occur in superposition. Advantageously, the load-distributing base layer is also designed to distribute the forces in other directions and possible moments over the multiple pressure vessels.

The pressure vessel system may also have multiple transverse struts. The transverse struts extend parallel to the multiple pressure vessels. Preferably, the transverse struts are disposed at least in certain regions and at least partially in intermediate regions formed by directly adjacent pressure vessels. The transverse struts may be fastened to the load-bearing base layer. As an alternative, the transverse struts may be formed in one piece with the load-bearing base layer. As an alternative or in addition, the transverse struts may be provided on the load-bearing cover layer. The transverse struts may advantageously provide further stiffening to the load-bearing base layer without additional installation space being required for this. This additional stiffening can also be achieved together with relatively low inherent weight. The transverse struts may have a substantially triangular cross section. The transverse struts may also be suitable for distributing the impact energy more uniformly over the pressure vessels and aligning the pressure vessels in the event of deformation.

The pressure vessel system may also comprise at least one bodywork attachment element for mechanical coupling of the multiple pressure vessels to the vehicle bodywork. The bodywork attachment may be designed to enable a displacement of the multiple pressure vessels into the mounting clearance for conversion of the impact energy. The at least one bodywork attachment element serves for direct or indirect fastening of the pressure vessel to the bodywork of the motor vehicle and can have any suitable shape. The connection piece disclosed here and/or the bodywork attachment element is/are designed to transfer (static and dynamic) forces and moments resulting from the pressure vessel itself during operation of the motor vehicle to the bodywork. Advantageously, the one or more bodywork attachment elements can engage at the respective end(s) of the pressure vessels. In one embodiment, the bodywork attachment element may be a support to which multiple pressure vessels are fastened. The support for its part may be attached to the bodywork of the motor vehicle at bodywork attachment points. For example, the bodywork attachment element may be a longitudinal member or a crossmember. The bodywork attachment element may in particular be attached to the bodywork in such a way that it is displaceable in the direction of the vehicle vertical axis. To this end, it may be attached to the bodywork via floating bearings or have predetermined breaking points which enable displacement in the direction of the vehicle vertical axis beyond a threshold value.

The pressure vessel system may also have at least one fuel line system which is connected to the multiple pressure vessels (100) and is fluidically connected to at least one fuel consumer, for example a fuel cell stack or a combustion engine. The fuel line system may be designed to enable a displacement of the multiple pressure vessels into the mounting clearance for conversion of the impact energy, in particular in such a way that no fuel or only a small amount of fuel escapes into the environment during the displacement. To this end, for example, it may be provided that the displacement of the pressure vessels in the direction of the vehicle vertical axis is compensated by flexible, or elastically deformable, line portions. As an alternative or in addition, it may be provided that possible pipe rupture safety devices, also referred to as excessive flow valves, prevent the escape of fuel from degraded fuel lines.

Preferably, the fuel power system comprises a fuel rail, to which the multiple pressure vessels are connected. The fuel rail can also be referred to as high-pressure fuel rail. It is usually provided upstream of the (high-pressure) pressure reducer. In principle, such a fuel rail may have a similar configuration to a high-pressure injection rail of a combustion engine. Expediently, the fuel rail comprises multiple rail connections for direct parallel connection of the pressure vessels without further connecting lines.

Advantageously, the individual rail connections are provided directly on the rail housing and/or are all at the same distance from one another. The fuel rail is expediently designed to maintain substantially the same pressures as the one or more pressure vessels which is/are connected to the fuel rail. The multiple pressure vessels are fluidically connected among one another or to one another without interruption. In this context, "without interruption" means that no valve that would interrupt this fluidic connection during correct operation is provided between the individual pressure vessels. Consequently, the fuel pressure in the various pressure vessels generally has substantially the same value.

In a preferred embodiment, the fuel rail is not made from a special housing, but rather instead is made from a fuel line or a fuel pipe, preferably a metal pipe and particularly preferably from a stainless steel pipe. The rail connections may be in the form of thickened regions of the fuel line. The fuel rail may comprise partial regions that are curved, expediently between two rail connections, for compensating changes in position of the pressure vessels. To this end, these partial regions of the fuel rail that are formed by the curved fuel rail can substantially elastically deform. The form or the shape of the fuel line is made in the curved partial region precisely for this purpose. The at least one fuel rail and the at least one bodywork attachment element can each clamp in multiple pressure vessels in one embodiment. Advantageously, it is thus possible to obtain a particularly simple, space-saving and cost-efficient pressure vessel system which can be mounted easily, reliably and quickly. According to the technology disclosed here, at least one thermally activatable pressure relief device can be connected directly to the at least one fuel rail disclosed here without further line portions. As an alternative or in addition, at least one thermally activatable pressure relief device may be provided on the at least one pressure vessel and preferably on each of the pressure vessels, preferably at the one or more ends which is/are distal in relation to the fuel-carrying portion or at the one or more proximal ends or at both ends. For example, the thermally activatable pressure relief devices may be provided in the connection pieces and/or corresponding end pieces at the remote ends of the pressure vessels. The thermally activatable pressure relief device, also referred to as thermal pressure relief device (=TPRD) or thermal safety device, is generally provided adjacent to the pressure vessel. In the event of the action of heat (for example caused by flames), this pressure relief device discharges the fuel stored in the pressure vessels into the environment.

At least one valve unit may be attached to the fuel rail directly and without further line portions, wherein the valve unit comprises at least one normally closed valve. Particularly, preferably, the multiple pressure vessels are fluidically connected to the valve without interruption during functionally correct operation of the motor vehicle. The valve is the valve the inlet pressure of which (substantially) corresponds to the pressure in the multiple pressure vessels. The valve is in particular a valve which is controllable in open-loop or closed-loop fashion. In Commission Regulation (EU) No 406/2010 of Apr. 26, 2010 implementing Regulation (EC) No 79/2009 of the European Parliament and of the Council on type-approval of hydrogen-powered motor vehicles, such a tank shut-off valve is also referred to as first valve. The valve serves, inter alia, to interrupt the fluidic connection between the individual pressure vessels and the downstream components of the fuel supply system during normal operation, for example if the motor vehicle assumes a parked state, and/or if a malfunction was detected and the fluidic connection is to be interrupted for safety reasons. Generally, no normally closed valves are provided between the fuel storage volume of the pressure vessels and the rail connections.

The technology disclosed here also relates to a motor vehicle having the pressure vessel system disclosed here. An underfloor region of the motor vehicle can be subdivided into various underfloor installation regions by at least one support. Such supports may be provided to transfer loads introduced into the motor vehicle in the event of a lateral impact to the opposite sill. A fuel rail, to which the pressure vessels disposed in the respective underfloor installation region are connected, may be provided on or in multiple or all underfloor installation regions. In one embodiment, it may be provided that, depending on customer requirements, the individual underfloor installation regions may be equipped with high-voltage batteries or pressure vessel systems.

In other words, the technology disclosed here relates to a pressure vessel system for an underfloor installation space. The underfloor installation space can be useable equally for high-voltage batteries and for pressure vessels. What is strived for is that, when the vehicle is hit locally (for example when moving off from a correspondingly high curb), it does not cause any damage to the pressure vessel system. By contrast to high-voltage batteries, pressure vessels are by nature subjected to a high internal pressure and as a result have a comparatively more robust outer wall. The pressure vessels are able to bear mechanical loads from the outside (generally better than batteries can), in particular when these loads are extensive. By introducing a load-distributing (base) layer between the (lower) baseplate and the pressure vessels, the (floor) gap between the baseplate and the pressure vessels can be filled preferably completely (or partially). In the event of an impact with a bollard, the pressure vessel can thus be carried along from the very first millimeter when the baseplate comes into contact with the bollard, and thus reduces the penetration depth for the same kinetic impact energy compared with the prior art (cf. FIG. 1; baseplate and air gap).

The gap between the pressure vessels and the upper delimitation (=upper underfloor covering) of the underfloor installation space can typically be provided in the form of what is referred to as a "mounting gap" (=mounting clearance). In the event of an impact with a bollard, this gap can, however, likewise be used for energy dissipation when the way in which the pressure vessels are suspended allows this. The gap, or the upper "mounting gap", can likewise be filled with a load-distributing (cover) layer. As a result, more energy can be dissipated and the abutment of the pressure vessels against the upper delimitation of the underfloor installation space can be reduced, or distributed extensively. The displacement of the pressure vessels can furthermore enable a longer energy dissipation path.

Instead of a few rectangular transverse struts, dimensionally adapted (for instance triangular) transverse struts may be used between all the pressure vessels at least on the bottom side. The triangular transverse struts can then for the one part serve to reduce the width that is to be spanned by contrast to the prior art (for example by a factor of 3 to 4), and at the same time support on the pressure vessels can likewise take place here as described above, with the result that the counter force increases to a greater extent with the penetration depth and the maximum penetration depth is thus reduced. The baseplate and the load-distributing intermediate layer may also be formed from one part.

The load-distributing intermediate layer may comprise technical foams, as are used for example in bicycle helmets. Preferably, the foam has auxetic properties, in order to provide particularly great resistance to an element with which an impact occurs and to distribute the impact over a larger surface area. As an alternative or in addition, sandwich panels with metal cover layers and a foam core can be used. In particular, these sandwich panels may already have the triangular structures.

In order to distribute local pressure peaks, underneath the pressure vessels a type of "corrugated board made of aluminum" can be used underneath the pressure vessels. In addition or as an alternative, the pressure vessels can be adhesively bonded onto the baseplate by means of an elastic adhesive as intermediate layer. Preferably, between the triangular crossmembers.

The technology disclosed here will now be explained with reference to the figures, in which:

DETAILED DESCRIPTION OF THE DRAWINGS

Figures 2, 3:
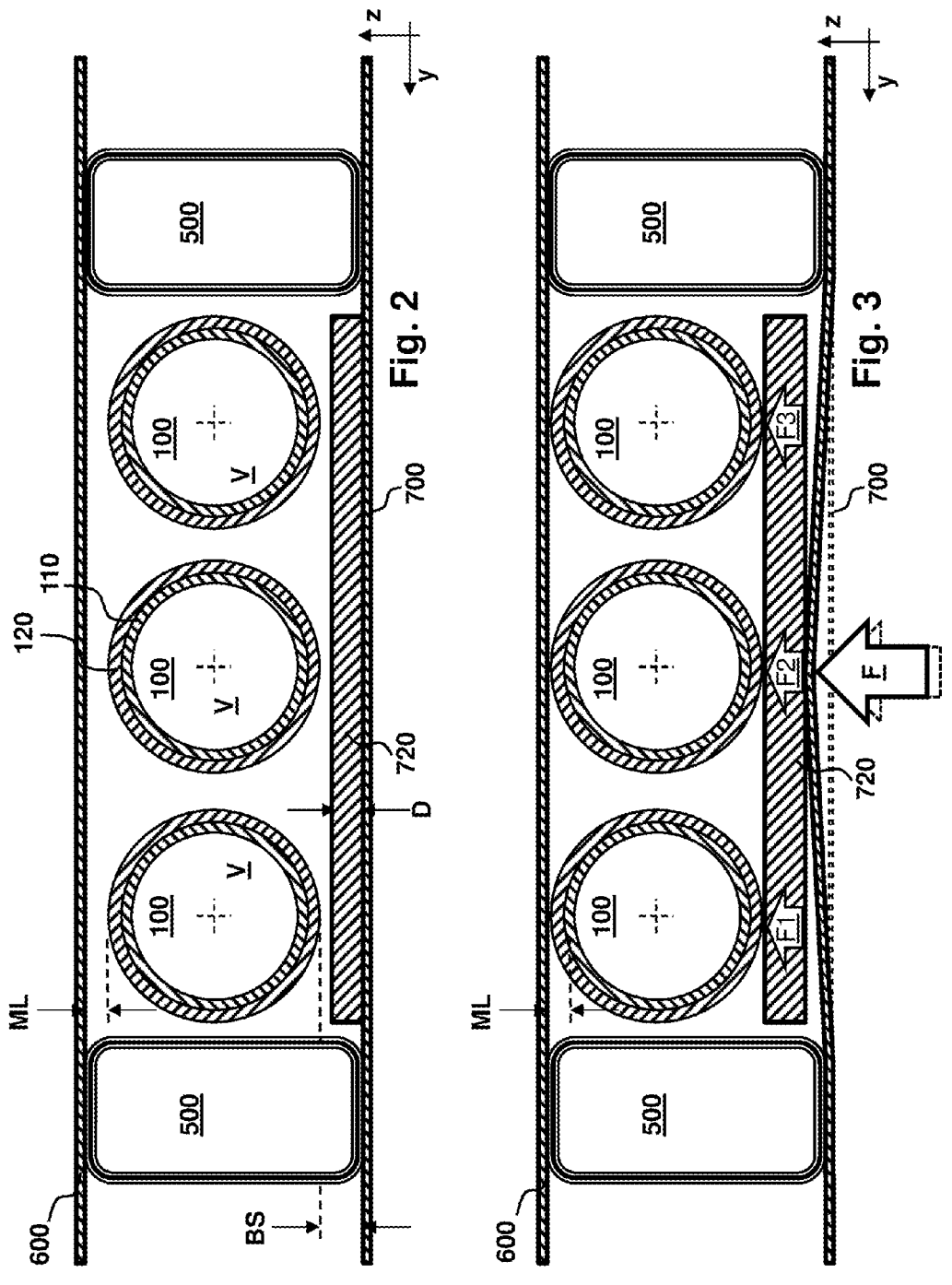
FIG. 2 shows a schematic view of one embodiment of the technology disclosed here.
FIG. 3 shows a further schematic view of the embodiment according to FIG. 2.

FIG. 2 shows a schematic cross-sectional view of a first embodiment of the technology disclosed here. What is shown here are three pressure vessels 100, each of which comprises a liner 110 and a fiber-reinforced layer 120. The three pressure vessels 100 are the same size and are provided parallel to one another in the underfloor region of a motor vehicle (not shown). The pressure vessels 100 are shown in their installation position. Instead of three pressure vessels 100, it would also be possible to provide any desired greater number of pressure vessels 100 in the underfloor region. The pressure vessels 100 are provided between two supports 500. These supports 500 also form the structure of the vehicle bodywork. They can, for example, be a constituent part of the bodywork of the motor vehicle. In that case, it can be provided, for example, that a pressure vessel assembly comprising at least the pressure vessels 100 and expediently also the load-distributing base layer 720 is mounted in the space formed by the two supports 500. In another embodiment, the supports 500 are also a constituent part of the pressure vessel assembly, wherein the pressure vessel assembly can be installed as a whole in the bodywork of the vehicle. The vehicle interior space (not shown) is in this instance delimited with respect to the underfloor region by the upper underfloor covering 600. The upper underfloor covering 600 may be formed, for example, by a wall of a housing of the pressure vessel assembly. As an alternative, the upper underfloor covering may be a constituent part of the bodywork of the motor vehicle. The upper underfloor covering 600 and the lower baseplate 700 have an extensive form here and cover the pressure vessels 100 and the support 500. Therefore, the pressure vessels 100 and possible fuel-carrying components of the pressure vessel system, which generally can be arranged between supports 500, are protected against environmental influences. The pressure vessels 100 are aligned substantially parallel to the vehicle longitudinal axis X here. Similarly, the pressure vessels 100 and the supports 50 could be installed in the direction of the vehicle transverse axis. The pressure vessels 100 are provided at the same distance from the lower baseplate 700 and from the upper underfloor covering 600 here. The lower baseplate 700 and the upper underfloor covering 600 in this case are formed parallel to the surface beneath the vehicle. However, this does not have to be the case. The lower baseplate 700 and the upper underfloor covering 600 virtually could run in another way adapted to the installation situation. A load-distributing base layer 700 is formed on the lower baseplate 700. The base layer 720 has a layer thickness D which is thicker than the lower baseplate 700 at least by a factor of 5 or at least by a factor of 10. The load-distributing base layer 720 has a stiffness against deformation in the direction of the vehicle vertical axis Z which is higher than that of the lower baseplate 700 at least by a factor of 10 or at least by a factor of 20.

FIG. 2 also shows the floor gap BS and the mounting clearance ML. The floor gap BS amounts to the minimum distance between the pressure vessels 100 and the inner side of the lower baseplate 700. If the pressure vessels 100 are at different distances from the load-distributing base layer 700, respective different floor distances BS are produced. The mounting clearance ML is required for the mounting of the pressure vessels 100 and is therefore provided in any case.

FIG. 3 shows the pressure vessel system of FIG. 2 in a state after the lower baseplate 700 has hit an object, for example a traffic bollard. The impact caused the lower baseplate 700 to deform from its initial position (shown in dashed line) owing to the local forces acting substantially in the direction of the vehicle vertical axis Z that result from the impact. In the process, the baseplate 700 together with the load-distributing base layer 720 move upward here in the direction of the vehicle vertical axis Z toward the multiple pressure vessels 100 and makes contact with the latter. The forces act only locally and only directly adjacently to the middle pressure vessel 100 (=proximal pressure vessel). Owing to the stiffness of the load-distributing base layer 720, it is able to divide the locally acting forces between all the pressure vessels 100, that is to say between the proximal middle pressure vessel and the two distal pressure vessels which are positioned at the side of the proximal pressure vessel. Consequently, forces which are smaller than the local forces acting on the outside of the lower baseplate 700 act on each of the pressure vessels. This division and preferably even distribution of the forces—and thus also of the impact energy—makes it possible overall to achieve an energy takeup or energy conversion which is more favorable because it is gentler. The pressure vessels 100 have a robust form such that they can take up and transfer forces, or impact energy, that is being transferred from the load-distributing baseplate 720 without further damage. As can be readily seen here, the effect of the impact here is to cause the load-distributing baseplate 720 to displace the pressure vessels 100 substantially in the direction of the vehicle vertical axis Z into the mounting clearance ML. This displacement further converts the forces, resulting from the impact, and the impact energy. If appropriate, the pressure vessels can transfer the forces and the impact energy over a large surface area of the upper underfloor covering 600. Overall, as a result the forces acting locally on the lower baseplate 700 are distributed over a comparatively large surface area of the load-distributing base layer 720 and the multiple pressure vessels 100, with the result that the impact energy thus distributed can then be converted by a comparatively low elastic or plastic deformation. Expediently, it is possible in particular to provide an upper load-distributing cover layer 620 to this end (not shown; cf. FIG. 4). In one embodiment, this load-distributing cover layer 620 may be designed to convert the impact energy acting on this layer to the best possible extent. To this end, the layer may for example have an elastic intermediate layer. As an alternative or in addition, the load-distributing cover layer 620 may be designed to distribute the impact energy transferred by the pressure vessels 100 even more uniformly, with the result that the surface pressure, which results from the impact energy and by means of which the upper cover layer 620 presses against the upper underfloor covering 600, to become even more uniform.

Figure 4:
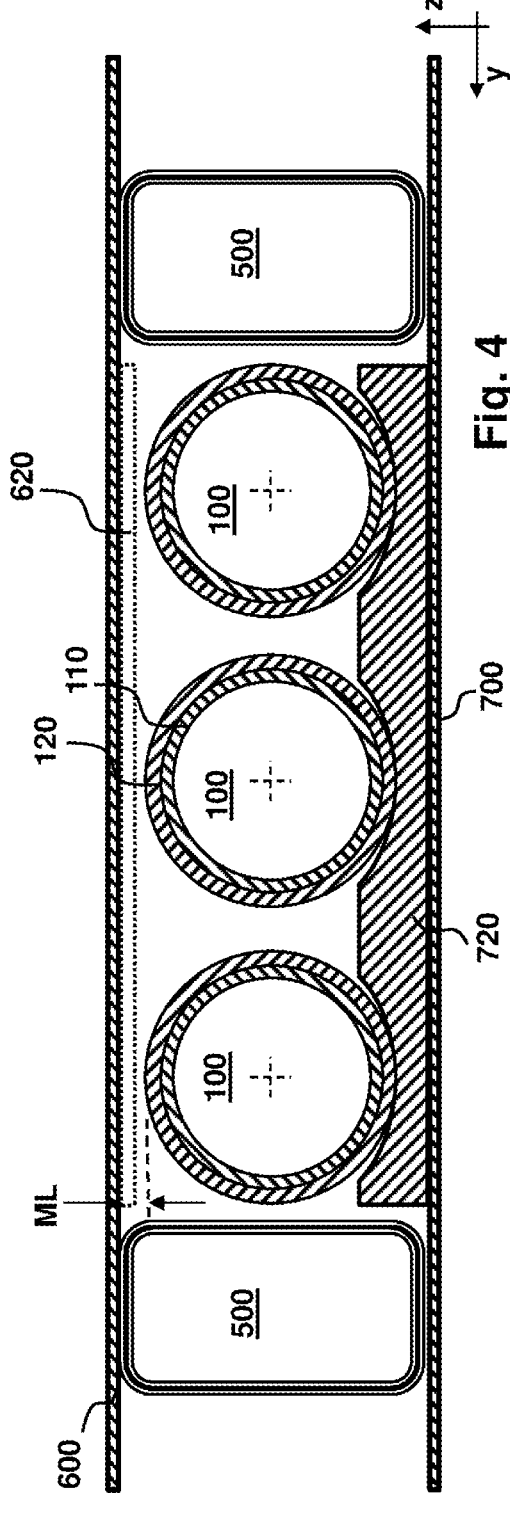
FIG. 4 shows a schematic view of a further embodiment.

FIG. 4 shows a further embodiment of the technology disclosed here. Below, only the differences in relation to the preceding embodiment will be explained and in all other respects reference is made to the description above. FIG. 4 shows an embodiment in which the load-distributing base layer 720 has receiving recesses. A respective pressure vessel 100 is at least partially received in each receiving recess. Advantageously, the installation space requirement can thus be decreased while maintaining the same stiffness of the load-distributing layer 720. The receiving recesses also guide the pressure vessels 100 at least a little when they are being displaced in the direction of the vehicle vertical axis Z.

Figure 5:
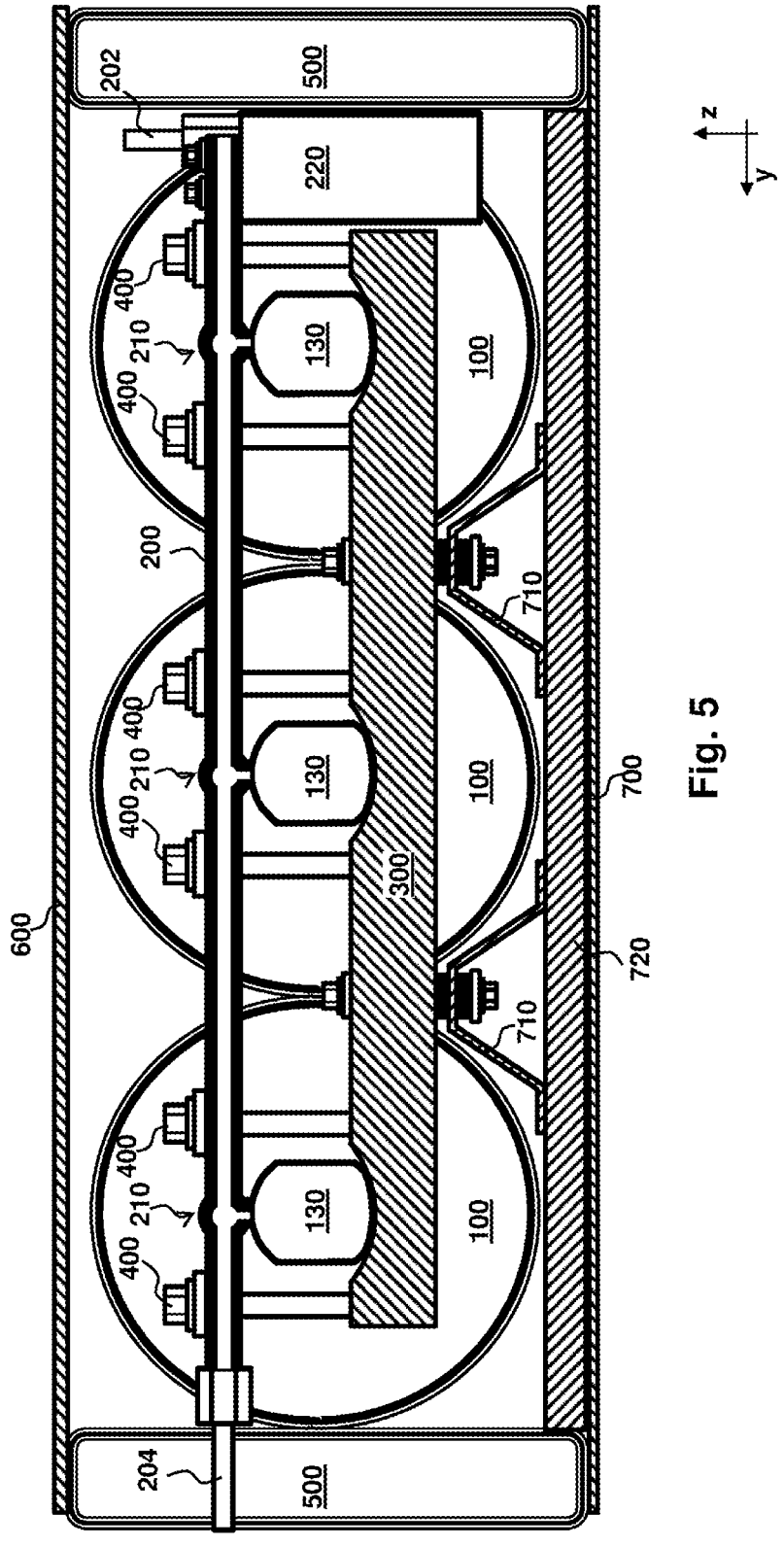
FIG. 5 shows a schematic view of a further embodiment.

FIG. 5 shows a schematic cross-sectional view of a further exemplary embodiment. Below, only the differences or additions in relation to the preceding embodiments will be explained. In all other respects, reference is made to the description above. The fuel rail 200 has a substantially straight form here and comprises three rail connections 210, via which the three pressure vessels 100 are fluidically connected to one another without interruption. Possible further components, such as a pipe rupture safety device or a thermally activatable pressure relief valve, are not shown.

Figure 1:
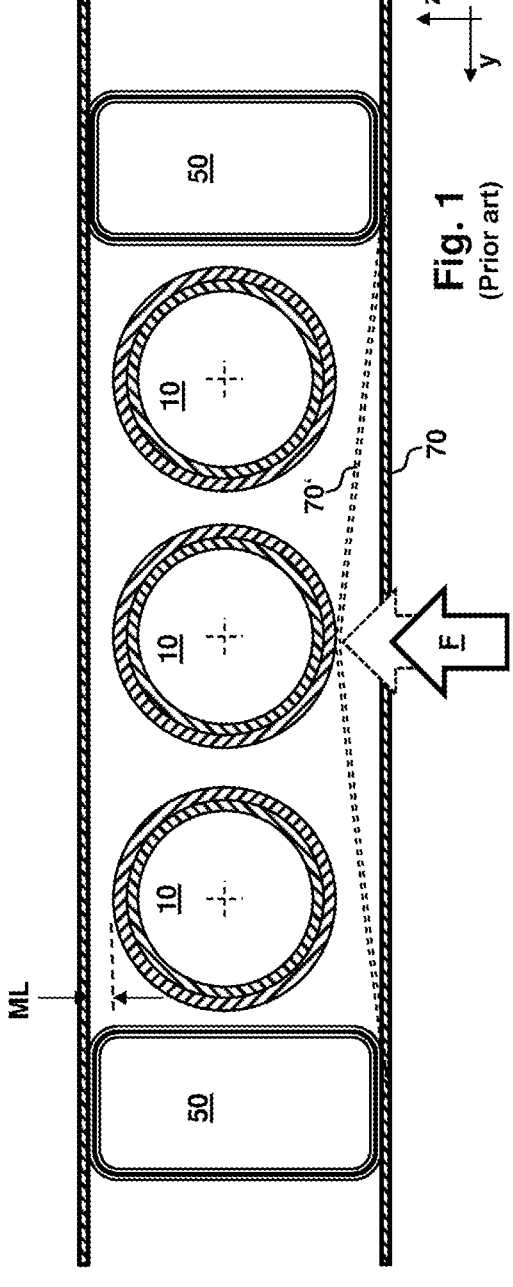
FIG. 1 shows a schematic cross-sectional view of one embodiment according to the prior art.

A respective connection piece 130 is guided out of each pressure vessel 100. These connection pieces 130 are advantageously produced from a metal alloy and are enclosed by the fiber-reinforced layer 120 (cf. FIG. 1) at least in certain regions. The fuel rail 200 is pressed here by clamping means 400, preferably with interposed support plates (not shown here), against side surfaces of those regions of the connection pieces 130 that are guided out of the respective pressure vessels 100. The sealing surfaces of the connection pieces 130 are aligned by the rail connections 210 at the same time. The bodywork attachment element 300, in particular its internal surfaces, applies the counter forces. This in addition keeps the connection pieces 130 in position. Transverse struts 710 protrude from the load-distributing base layer 720. These transverse struts 710 serve for additional stiffening of the load-distributing base layer 720. Here, a valve unit 220 is fastened directly to the fuel rail 200 at the side of the fuel rail 200. Provided in the valve unit 220 is a normally closed valve, which prevents the feed of fuel to the downstream components of the fuel supply system (for example the components of an anode subsystem of a fuel cell system). Generally, a pressure reducer, which lowers the pressure to a medium-pressure range (generally to a value between 5 bar and 50 bar) is provided adjacent to the valve unit 220 or in the valve unit 220. Here, an extraction line connection 202, which may be connected for example to the extraction line (not shown), is guided out of the valve unit 220. At the other end of the fuel rail, a refueling line connection 204 which may be connected to a refueling line is provided here. Instead of lines leading to further components, it would also be possible to couple further fuel rails or other elements there directly.

Figure 6:
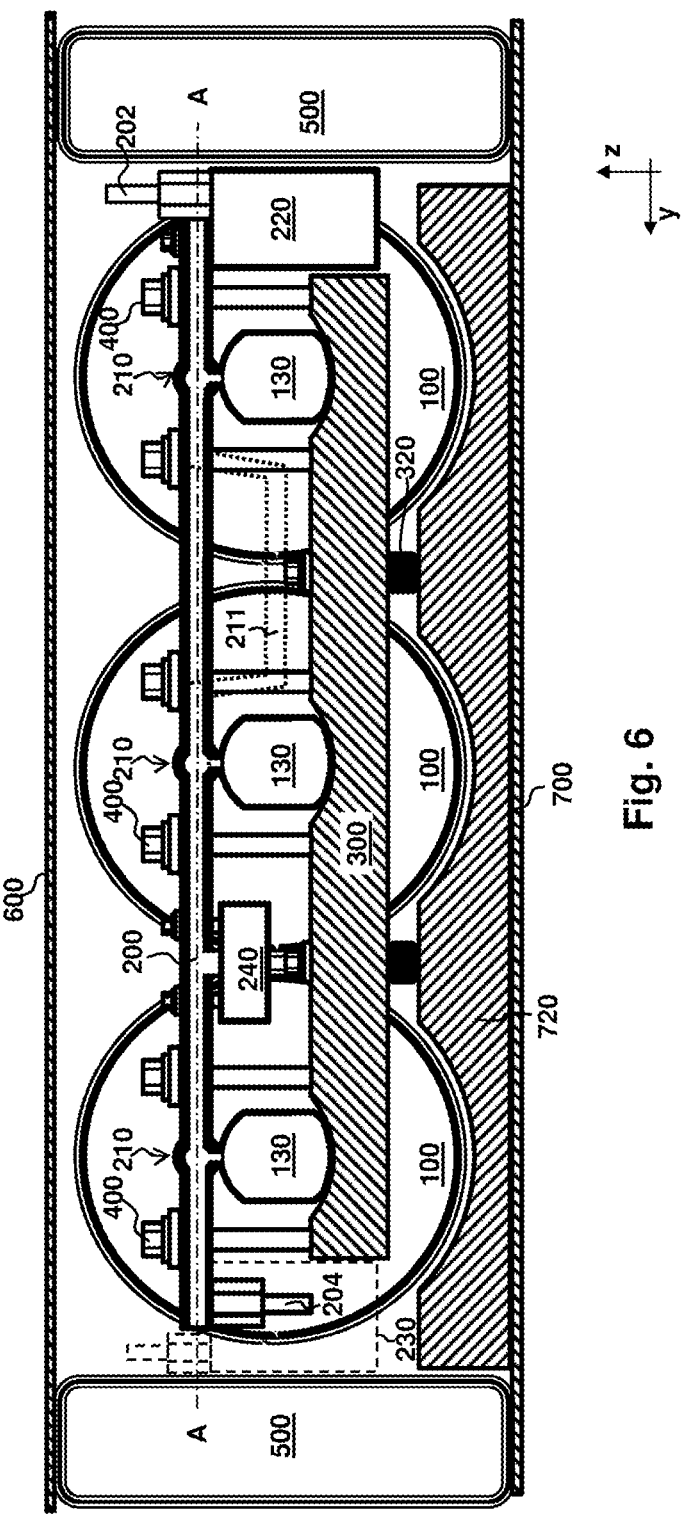
FIG. 6 shows a schematic view of a further embodiment.

FIG. 6 shows a schematic cross-sectional view of a further exemplary embodiment. Below, only the most important differences in relation to the preceding exemplary embodiments will be explained in more detail. In all other respects, reference is made to the explanations given for the other figures. An alternative shape of the fuel rail 200 is shown in dotted line. Instead of a straight fuel rail 200, the rail connections of which lie on the axis A-A, the fuel rail 200 could have curved partial regions which are at least partially spaced apart from the axis A-A. For example, it is possible for the fuel rail to have not a straight form, but rather a form with a wavy shape, a meandering shape or a zigzag shape. Advantageously, positional changes caused by elastic deformations can therefore be better compensated. The fuel rail 200 comprises, in addition to the rail connections 210 for the pressure vessels 100 and the connections for the valve unit 220 or the line connections 202, 204, a further pressure relief connection for connection of the thermally activatable pressure relief device 240. If a thermal event occurs, the pressure relief device 240 triggers and the pressure in all three pressure vessels 100 is relieved. Preferably, it may be provided that, at the ends of the fuel rail 200, in particular at or in the line connections 202, 204 and/or in the valve unit 220, there is provided a pipe rupture safety device, which prevents the fluidic connection to the adjoining components of the fuel supply system from the motor vehicle, if (i) damage to the pressure vessels 100 and/or the fuel rail 200 were to occur; and/or (ii) the pressure relief device 240 were to be activated; and/or (iii) a line rupture occurs owing to the displacement of the multiple pressure vessels 100 in the direction of the vehicle vertical axis Z.

The fuel rail 200 can additionally comprise a further valve unit 230 (shown in dashed line), which may be provided at the other end of the fuel rail 200. A non-return valve, which prevents the backflow of fuel into the upstream region of the refueling path, may for example be provided in this valve unit 230. In a preferred embodiment, thermally activatable pressure relief devices 240 are also provided at least on each third or at least on each second pressure vessel 100 at the ends that face away from the connection pieces 130. The supports 500, which subdivide the individual underfloor installation spaces, are shown here schematically. The left-hand support 500 here extends downward from the floor 600 of the motor vehicle. To overcome this, the refueling line connection 204 is provided oriented downward here. Consequently, here a refueling line can be laid underneath the support 500. The fuel line can be laid at the right-hand edge beyond the support 500. The specific positioning of the lines can be adapted in a manner corresponding to the installation situation. Here, the load-distributing base layer 720 has receiving recesses, as were explained for example in conjunction with the embodiment according to FIG. 4.

Figure 7:
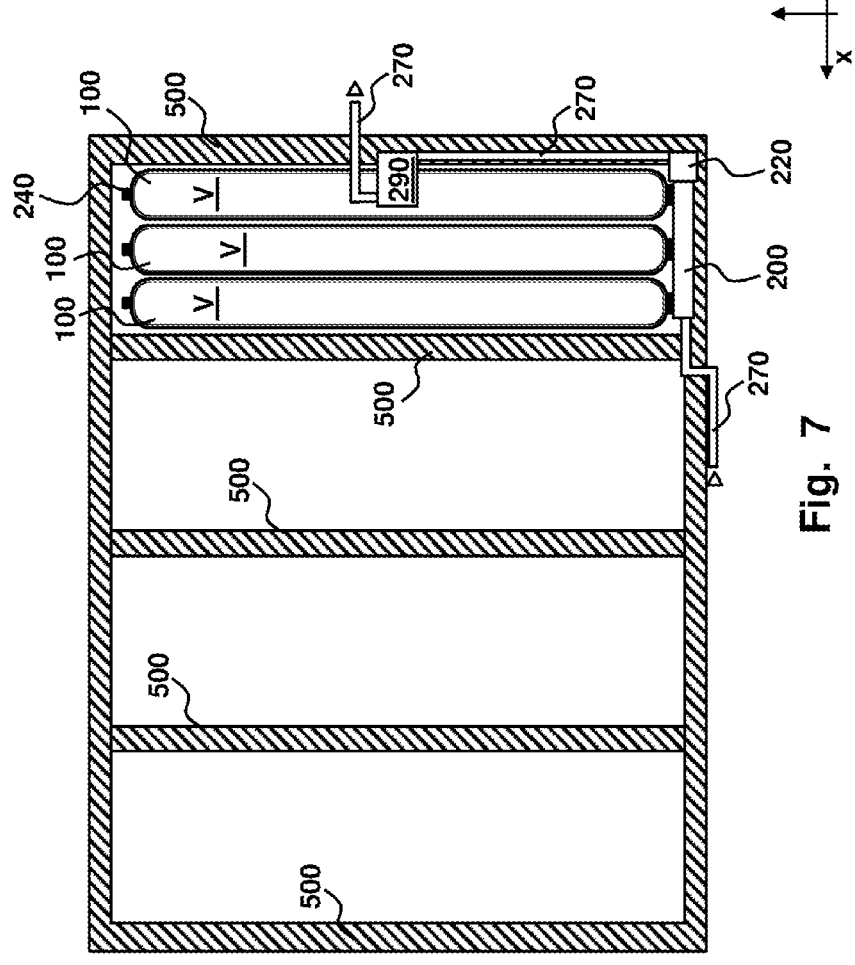
FIG. 7 shows a schematic view of an underfloor region of a motor vehicle according to a further embodiment.

FIG. 7 shows a plan view of an underfloor region of a motor vehicle. The supports 500 subdivide the underfloor region into various underfloor installation regions. The underfloor installation regions are substantially the same size here. The individual supports 500 extend in the vehicle transverse direction from one side sill to the other side sill here and substantially contribute to the stiffening of the bodywork structure. Here, a pressure vessel system is provided in the right-hand underfloor installation region. The pressure vessel system comprises three pressure vessels 100, which are provided between two supports 500. The pressure vessels 100 are positioned parallel to one another and parallel to the supports 500. One end of each pressure vessel 100 is connected to the fuel rail 200 via a connection piece 130. A thermally activatable pressure relief device 240 is provided at the opposite end of each pressure vessel 100. The fuel rail 200 forms a fuel-carrying portion. A fuel line 270, which serves as refueling line and is connected to the tank coupling (not shown) of the motor vehicle, is connected to one end of the fuel rail 200. The valve unit 220 is provided with the normally closed valve at the other end of the fuel rail 200. The normally closed valve is controlled in open-loop or closed-loop fashion by a control unit of the motor vehicle. The actuation of the valve brings about the extraction of fuel from the pressure vessels. The valve unit 220 is fluidically connected to a pressure reducer 290 via a fuel line 270. A further fuel line 270, which leads to the energy converter (not shown) of the motor vehicle, is provided downstream of the pressure reducer 290. Depending on the configuration of the motor vehicle, further pressure vessels and further fuel rails 200 that are fluidically connected to the pressure vessels shown in series or in parallel may be provided in the further underfloor installation regions. It is similarly conceivable for high-voltage accumulator batteries to be provided in one underfloor installation region or in multiple underfloor installation regions. The use of the same vehicle architecture for a motor vehicle which is driven purely by electric battery and does not have a pressure vessel system can also be envisaged.

Figure 8:
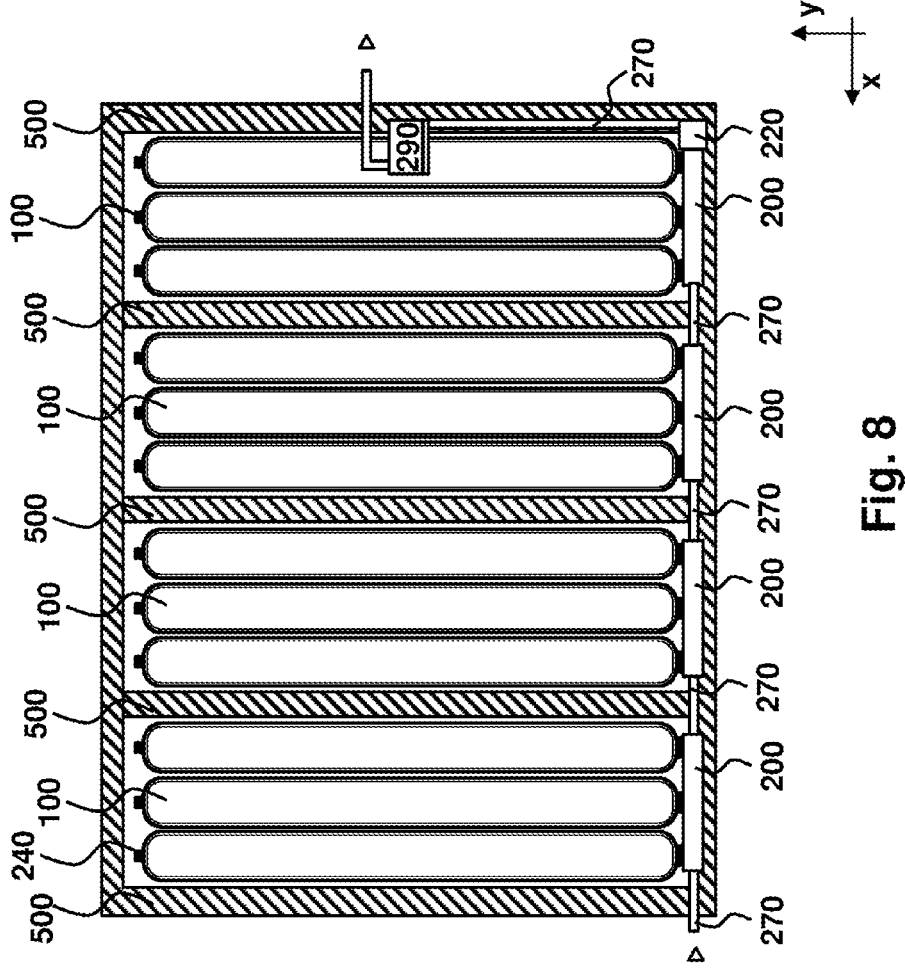
FIG. 8 shows a schematic view of an underfloor region of a motor vehicle according to a further embodiment.

FIG. 8 shows a further plan view of an underfloor region of a motor vehicle. In this embodiment, four fuel rails 200 are provided, wherein a fuel rail 200 with three pressure vessels 100 is disposed in each underfloor region. The fuel rails 200 are connected in series here and are each connected to one another by means of fuel lines 270. The fuel lines 270 are guided around the supports 500. A valve unit 220, which likewise contains the normally closed valve and shuts off all the pressure vessels 100 provided in the underfloor region from the rest of the fuel supply system, is provided between the pressure reducer 290 and the fuel rails 200. Only one fuel rail 200 of the four fuel rails 200 is connected to a fuel line 270 serving as refueling line. The two central fuel rails 200 are connected merely to adjacent fuel rails 200.

In the context of the technology disclosed here, the term "substantially" (for example "substantially perpendicular") includes the exact property or the exact value (for example "perpendicular") and deviations that are irrelevant for the function of the property/of the value (for example "tolerable deviation from perpendicular").

The description of the present invention given above serves only for illustrative purposes and not for the purposes of limiting the invention. Various changes and modifications are possible within the context of the invention without departing from the scope of the invention and its equivalents.

Instead of three pressure vessels, it is possible to provide any desired number of pressure vessels 100 in one pressure vessel assembly. It is also possible to provide a different number of fuel rails 200 instead of one fuel rail 200 or four fuel rails 200. In one embodiment, a fuel rail 200 may extend over the entire underfloor region. Separate fuel lines 270 may advantageously also be formed from one fuel rail 200, for example by guiding the fuel rail 200 around a support 500. The fuel rail 200, as discussed in conjunction with FIG. 6, can also be provided in the embodiments according to the other figures. The possible use in all embodiments of load-distributing base layers with or without recesses can similarly be envisaged. In addition to the bodywork attachment elements 300 explained here and the fuel line system explained here, it is also possible to use a very different fuel line system.

LIST OF REFERENCE SIGNS

70, 70' Underbody panel
100, 10 Pressure vessels
110 Liner
120 Fiber-reinforced layer
130 Connection piece
200 Fuel rail
202 Extraction line connection
204 Refueling line connection
210 Rail connection
211 Curved partial regions
220, 230 Valve unit
240 Thermally activatable pressure relief device
270 Fuel line
290 Pressure reducer
300 Bodywork attachment element
400 Clamping means
500, 50 Support
600 Upper underfloor covering
620 Load-distributing cover layer
700 Lower baseplate
710 Transverse strut
720 Load-distributing base layer
A-A Axis
BS Floor gap
D Layer thickness
F Locally acting forces
F1, F2, F3 Forces
ML Mounting clearance
X Vehicle longitudinal axis
Y Vehicle transverse axis
Z Vehicle vertical axis

The invention claimed is:

1. A pressure vessel system for a motor vehicle, comprising:
   a plurality of pressure vessels configured to store fuel; and
   at least one load-distributing base layer, which is disposed between a lower baseplate and the plurality of pressure vessels;
   wherein the load-distributing base layer is designed to distribute forces that act locally on the lower baseplate, and act on the lower baseplate substantially in a direction of a vehicle vertical axis, over the plurality of pressure vessels;
   wherein a first pressure vessel, which is provided directly in the region of the locally acting forces, is a proximal pressure vessel;
   wherein pressure vessels disposed directly adjacent to the proximal pressure vessel are distal pressure vessels; and
   wherein the load-distributing base layer distributes the forces acting locally on the lower baseplate over the plurality of pressure vessels in such a way that the locally acting forces are divided between the proximal pressure vessel and the distal pressure vessels, such that at least 30% of the forces that are acting are transferred to the distal pressure vessels.

2. The pressure vessel system according to claim 1, wherein the load-distributing base layer covers the plurality of pressure vessels.

3. The pressure vessel system according to claim 1, wherein the load-distributing base layer has two sides, each of which has a surface area of approximately 0.3 m$^2$ to approximately 4 m$^2$.

4. The pressure vessel system according to claim 1, wherein the load-distributing base layer covers at least 60% of the lateral surface of the pressure vessels.

5. The pressure vessel system according to claim 1, wherein a mounting clearance is provided between the pressure vessels and an upper underfloor covering; and
   wherein the pressure vessel system is designed to allow a displacement of the plurality of pressure vessels into the mounting clearance in the direction of the vehicle vertical axis.

6. The pressure vessel system according claim 5, further comprising:
   at least one bodywork attachment element for mechanically coupling the plurality of pressure vessels to the vehicle bodywork; and
   at least one fuel line system, which is fluidically connected to the plurality of pressure vessels;
   wherein the bodywork attachment element and/or the fuel line system are designed to enable a displacement of the plurality of pressure vessels into the mounting clearance.

7. The pressure vessel system according claim 5, wherein the pressure vessel system is designed to transfer impact energy acting on the lower baseplate at least partially via the plurality of pressure vessels to the upper underfloor covering.

8. The pressure vessel system according to claim 1, wherein a load-distributing cover layer is provided in the mounting clearance for a more uniform distribution of impact energy over an upper underfloor covering.

9. The pressure vessel system according to claim 1, further comprising transverse struts protruding from the base layer that project at least in certain regions into intermediate regions formed by directly adjacent pressure vessels.

10. The pressure vessel system according to claim 1, wherein a respective floor gap is formed between the pressure vessels and the lower baseplate, and wherein the layer thickness of the load-distributing base layer at least in certain regions is at least 50% of a gap width of the respective floor gap.

11. The pressure vessel system according to claim 1, wherein the pressure vessels are fastened directly to the base layer and make contact with the base layer in an installation position.

12. The pressure vessel system according to claim 1, wherein the lower baseplate and the load-distributing base layer are formed in one piece.

13. The pressure vessel system according to claim 1, wherein the layer thickness of the load-distributing base layer and/or of the load-distributing cover layer is at least 5 mm.

14. The pressure vessel system according to claim 1, wherein the load-distributing base layer and/or the load-distributing cover layer comprises an auxetic material and/or an intumescent material.

15. The pressure vessel system according to claim 1, wherein the load-distributing base layer and/or the load-distributing cover layer comprises a sandwich structure, a lattice structure and/or a honeycomb structure.

16. The pressure vessel system according to claim 1, wherein the load-distributing base layer and the plurality of pressure vessels conjointly form a pressure vessel assembly, wherein the entire pressure vessel assembly is mountable in a motor vehicle in one mounting step.

17. The pressure vessel system according to claim 4, wherein the load-distributing base layer covers at least 80% of the lateral surface of the pressure vessels.

18. The pressure vessel system according to claim 10, wherein a respective floor gap is formed between the pressure vessels and the lower baseplate, and wherein the layer thickness of the load-distributing base layer at least in certain regions is at least 80% of a gap width of the respective floor gap.

19. A pressure vessel system for a motor vehicle, comprising:

a plurality of pressure vessels configured to store fuel; and at least one load-distributing base layer, which is disposed between a lower baseplate and the plurality of pressure vessels;

wherein the load-distributing base layer is designed to distribute forces that act locally on the lower baseplate, and act on the lower baseplate substantially in a direction of a vehicle vertical axis, over the plurality of pressure vessels; and wherein the load-distributing base layer and/or the load-distributing cover layer comprises a metal foam.

* * * * *